F. M. Caldwell,
Plow.
No. 97,162. Patented Nov. 23, 1869.
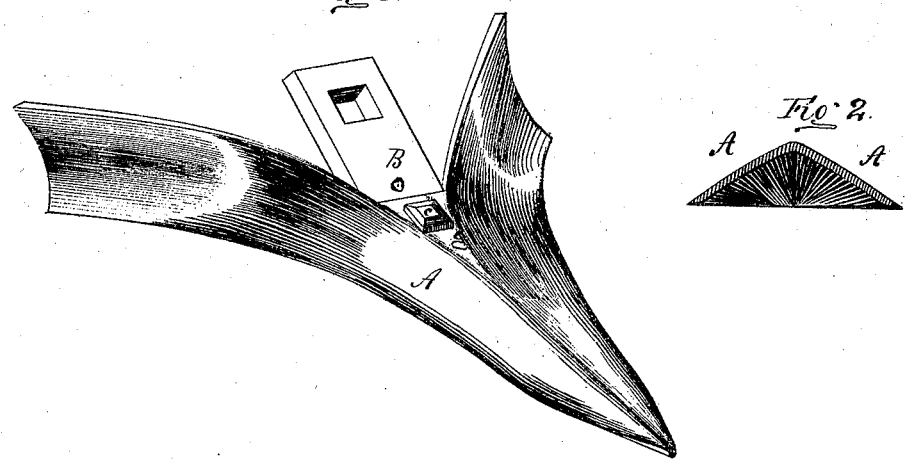
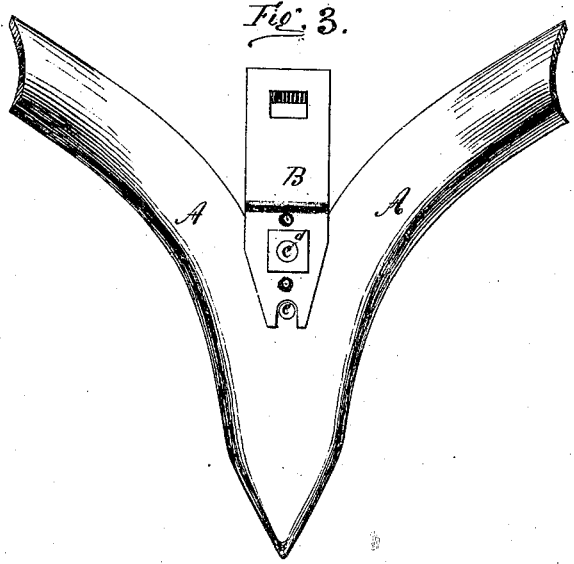
Witnesses:
Godfrey Mathys
B. F. James
Inventor:
F. M. Caldwell

UNITED STATES PATENT OFFICE.

FRANCIS M. CALDWELL, OF NEW YORK, N. Y.

IMPROVEMENT IN PLOWS.

Specification forming part of Letters Patent No. 97,162, dated November 23, 1869.

*To all whom it may concern:*

Be it known that I, FRANCIS M. CALDWELL, of the city, county, and State of New York, have invented a new and useful Improvement in Plows; and I do hereby declare that the following is a full, clear, and exact description of the construction and operation of the same, reference being had to the annexed drawings, making a part of this specification, in which—

Figure 1 shows a perspective and front view of my invention; Fig. 3, the reverse side of the same with the mode of attachment of the stem, and Fig. 2 a cross section of the point of the plow.

To enable others skilled in the art to make and use my invention, I will proceed to describe the same.

A A (represented in the drawings) is a plate of steel, swaged or cut in the form shown; or the same may be struck out by means of a machine constructed for that purpose. That portion of plow coming in contact with the ground is beveled to make a suitable edge, and of sufficient sharpness to cut roots, &c., coming in contact with the edge. The beveling extends from the lower ends of the wings to within from one to two inches of the point at X. Being constructed in this form, the abrasion incident to the contact of the plow with the sand, gravel, or loam of the earth tends to keep the plow sharp.

B is a stem attached to the plow-sweep A A by means of the bolt $c$, and retained in position by means of the lug $e$, formed on the under side of the plow-sweep. This stem can be adjusted at different heights by the addition of bolt-holes in the same at varying distances, and so constructed that one or more of the holes shall fit upon the lug $e$. As the working part of this plow becomes worn or in any manner injured, the same stem can be applied to another. This stem is made of stout iron with a hole at its upper part, where it can be attached to the wood-work of the plow, and as I contemplate in the manufacture of the same to keep a constant supply of both stems and plows, either one or the other can be easily duplicated to correspond to the varying sizes of the plow used.

What I claim as my invention, and desire to secure by Letters Patent, is—

1. The adjustable stem B, when constructed and arranged in the manner and for the purpose herein described.

2. The combination and arrangement of the stem B with the plow-sweep A A, bolt $c$, and lug $e$, in the manner and for the purpose herein described.

F. M. CALDWELL.

Witnesses:
B. F. JAMES,
EDM. F. BROWN.